PHONOGRAPH PITCH SENSITIVE TRIP MECHANISM

Filed Aug. 31, 1967

3,452,993
PHONOGRAPH PITCH SENSITIVE TRIP MECHANISM

John A. Rankin, deceased, late of St. Joseph, Mich., by Vera G. Rankin, executrix, St. Joseph, and Gerald H. Freier, Benton Harbor, Mich., assignors to V-M Corporation, Benton Harbor, Mich., a corporation of Michigan Filed Aug. 31, 1967, Ser. No. 664,889
Int. Cl. G11b *17/06*
U.S. Cl. 274—15 7 Claims

ABSTRACT OF THE DISCLOSURE

A mechanism for sensing the end of play of a phonograph record and for initiating the recycling of the tone arm wherein a sensing arm monitors the rate of lateral movement of the tone arm and actuates the recycling operation when the tone arm enters the lead-out grooves of the record, the tripping force being provided by the turntable motor.

*Background and summary of the invention*

This invention relates to a mechanism for sensing the end of the play of a phonograph record, and for providing a tripping function to initiate a record changing cycle or shut-off.

At least three basic conditions exist at the end of record play that could be utilized to signal the recycling operation. First, is the position trip which utilizes the specific inward location of the tone arm to actuate the trip mechanism. The position trip lends itself to various methods of detecting the physical location of the tone arm without mechanical contact, such as the use of a photoelectric device, but its use may be unsatisfactory if the records to be played have not all been formed to end the record play at the same position. This difficulty is often encountered with records of foreign manufacture which do not always conform to the United States dimensional standards.

A second condition which may be utilized to initiate recycling is the loss of program signal. This system is based on triggering the trip mechanism after a specific time interval during which the program signal from the cartridge has ceased. A major limitation with this system are problems in accurately controlling the time interval to insure passing cross-over grooves and extended quiet passages. A further difficulty is that a scratched record might not actuate the tripping mechanism.

The third condition commonly utilized to actuate the recycling operation is the change in the lateral movement rate of the tone arm when the stylus enters the lead-out portion of the record. A system utilizing this condition is generally called a "velocity trip" in the industry although the term "pitch sensitive trip" might be a more accurate term. Basically, under this system the lateral displacement of the tone arm is checked once each record revolution as the stylus tracks the spiral groove of the record. As per record manufacturing standards, the pitch or displacement per revolution of the tone arm does not exceed a specified distance (one sixteenth of an inch under United States standards) when tracking in the program portion of the record. However, when the tone arm engages the lead-out grooves, the groove pitch significantly increases and, upon detection by an appropriate mechanism, the trip occurs.

Previously used mechanical pitch sensitive trip devices can be considered to depend in one way or another upon a mechanism that is reset once per turntable revolution. The tone arm has provided the force to overcome the friction in all of these devices and, therefore, the stylus force required to provide this force and still adequately track the record has to be significantly increased. This has resulted in greater wear on both the record and needle, and often resulted in the needle jumping the grooves.

It is an object of this invention to provide a pitch sensitive trip mechanism in which the force requirement between the stylus and record used to actuate the trip mechanism can be reduced to substantially zero. The force utilized in the device of the present invention is provided by the rotation of the turntable, and since it is small compared to the inertia of the turntable and its driving force, no speed change of the turntable is detectable.

A further object is to provide a trip mechanism of high efficiency which can be installed at minimal expense and which, in its operation, will be substantially silent.

Other objects and advantages of this invention will readily come to mind from the following detailed description and claims hereinafter appended.

*Description of the preferred embodiment*

Figures 1, 2, 3, 4:
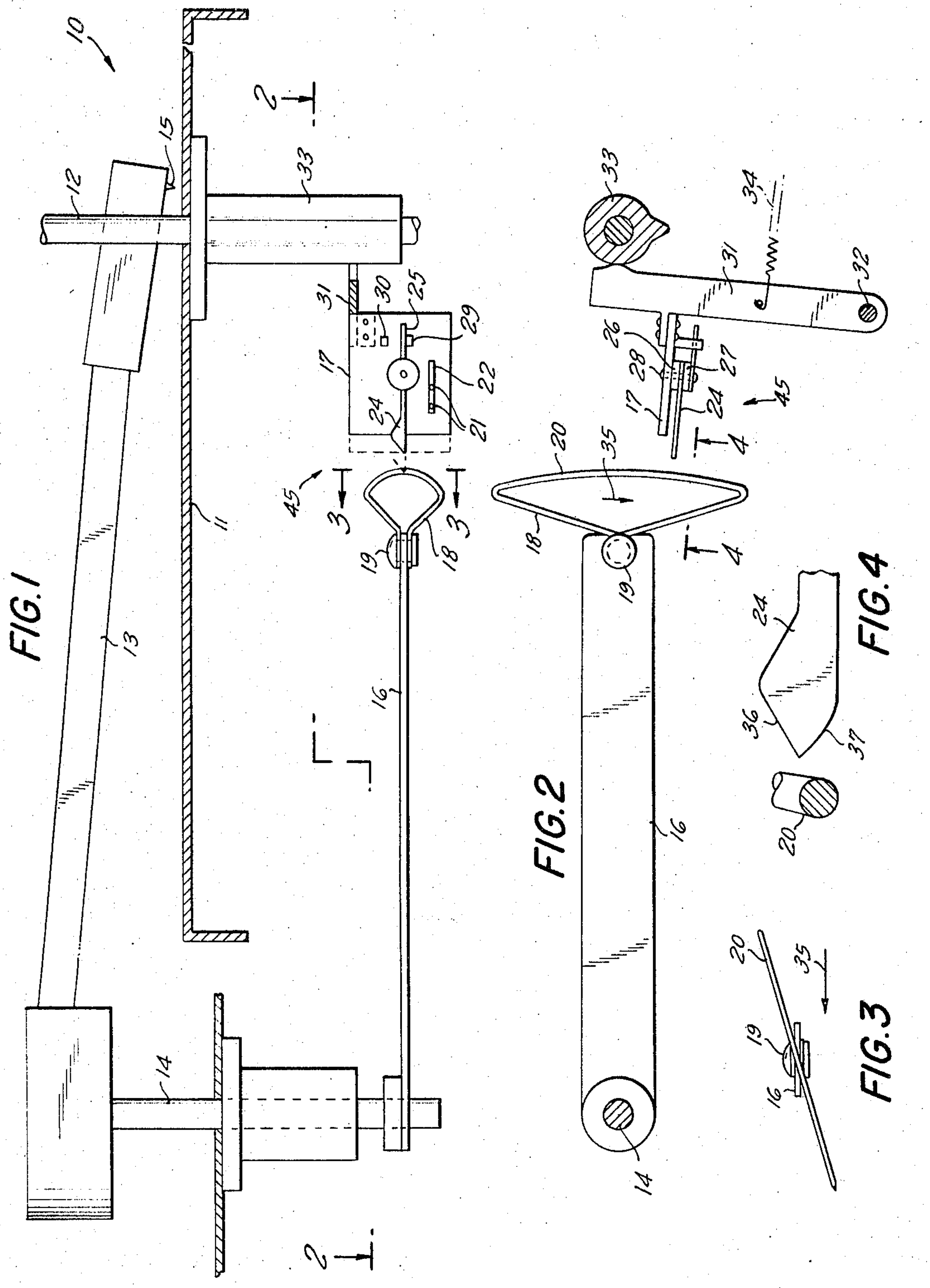
FIG. 1 is a fragmentary side elevational view, partly in section, showing a record changer embodying the subject invention.
FIG. 2 is a horizontal sectional view taken along the line 2—2 of FIG. 1, looking in the direction of the arrows.
FIG. 3 is a vertical elevational view taken along the line 3—3 of FIG. 1 looking in the direction of the arrows.
FIG. 4 is a fragmentary horizontal sectional view taken along the line 4—4 of FIG. 2, also looking in the direction of the arrows.

FIG. 1 illustrates a conventional record changer 10 which incorporates the features of this invention. Only those elements of the changer necessary for an understanding of the invention have been illustrated for purposes of clarity. The changer 10 includes a turntable 11 driven by a motor (not shown) in a conventional manner to rotate about the axis of the spindle 12. The tone arm 13 is pivotally mounted to the changer by the support spindle 14. The tone arm is provided with a cartridge and stylus or needle 15 adjacent to its free end. The stylus 15 tracks in the groove of a record as it is rotated with the turntable 11 in order to produce sound in the normal manner, the record being properly centered on the turntable by the spindle 12. The tone arm 13 is mounted so as to be free to pivot about the axis of the support spindle 14 in order that the stylus 15 may follow the grooving in the rotating and supported record. Any of the conventional arrangements normally utilized for mounting the tone arm 13 to its supporting spindle 14 which will permit the required universal movement of the tone arm may be utilized with this invention.

The mechanism for initiating the recycling of the tone arm is indicated generally at 45. It includes a wand 16 and carriage 17. The wand 16 is fixedly mounted to the support spindle 14 of the tone arm such that the wand follows the track of the tone arm across the phonograph record. A loop or wireform 18 is mounted at the free end of the wand by suitable means, such as a rivet 19. The forward end of the loop or wireform provides an arcuate ramp 20 which, as best seen in FIG. 3, lies in a plane transverse to the plane of the turntable 11.

The carriage 17 is slidably mounted between a forward (indicated by the dashed line in FIG. 1) and a rear position, it being arranged to slide on guide elements, such as the pins 21 extending through the slot 22 in the carriage.

The carriage is also supported by the cam follower 31, as hereinafter further described.

A sensing arm 24 and a trip arm 25 are mounted on the carriage 17 by means of a double friction clutch arrangement. The friction clutch includes two flat friction discs 26 and 27 which are respectively positioned between the carriage 17 and sensing arm 24, and the sensing arm 24 and trip arm 25. A pin 28 maintains a moderate compressive force between these elements such that the sensing arm and trip arm may rotate when a force is applied thereto, but will maintain any given position in the absence of such a force. Two abutments 29 and 30 are positioned to limit the rotation of the trip arm 25 for the purposes hereinafter set forth.

The cam follower 31 is secured to the carriage by any suitable arrangement to pivot about the axis 32. The cam follower 31 rides along a cam 33 which is mounted to rotate with the turntable 11 about the axis of the spindle 12. Any suitable means may be used to urge the follower against the cam. This can readily be achieved by spring 34 fastened, as desired, to the frame. Thus, as the cam 33 rotates, the cam follower 31 is rotated to the left, as seen in FIG. 2, once upon each rotation of the turntable 11 to thereby effect movement of the carriage 17 to its forward position.

As the record is being player, the tone arm 13 and the wand 16 are moved in the direction of the arrow 35 by virtue of the stylus 15, following the grooves of the record. Concurrently, the carriage 17 is moved between its forward and rear positions once upon each rotation of the turntable 11 in the manner previously described. By design, the leading edge of the sensing arm 24 contacts the arcuate ramp 20 when the carriage is in its forward position.

The leading edge of the sensing arm is made up of an upper camming surface 36 and a lower camming surface 37, as best seen in FIG. 4. As the wand 16 is moved in the direction of the arrow 35, the positioning of the arcuate ramp 20 is slowly raised with respect to the sensing arm. Thus, as the sensing arm engages the ramp upon each revolution, the sensing arm is also slightly raised by reason of the engagement between the ramp 20 and lower camming surface 37. Once the sensing arm has been raised in this manner, it is retained in such position by reason of the friction disc 26. It will be noted that the trip arm 25, while it has a tendency to rotate in a clockwise direction by reason of the movement of the sensing arm 24, is prevented from such movement by the abutment 29. Thus, during the movement of the tone arm 13 across the program portion of the record, the sensing arm is caused to raise slowly while the trip arm 25 remains stationary.

Upon engagement of the stylus with the leadout grooves, the tone arm and wand move in the direction of the arrow 35 at a more rapid rate. When this occurs, a larger segment of the arcuate ramp 20 passes the sensing arm 24 during each turntable rotation. Consequently, the ramp is caused to engage the upper camming surface 36 rather than the lower camming surface 37 and then pushes the sensing arm in a downward direction. This movement in turn causes the trip arm 25 to be rotated in a counterclockwise direction by reason of its engagement with the sensing arm 24 through the friction disc 27. The movement of the trip arm 25 controls a suitable mechanism to initiate the recycling operation of the tone arm. The particular details of the recycling mechanism form no part of this invention and thus have not been illustrated. The movement of the trip arm 25 may be utilized to actuate any of the conventional recycling mechanisms.

The trip arm 25 is limited in its movement by a second abutment 30 which is so positioned that a sufficient movement of the arm 25 is permitted to initiate the recycling mechanism and yet also permit the sensing arm 24 to be reset to its original relationship relative to the trip arm. After this occurs, the unillustrated recycling mechanism will return the trip arm 25 to its original position adjacent the abutment 29, and the sensing arm 24 is returned to its ready position substantially as shown in FIG. 1.

It will be apparent that the present invention provides a significant advantage over all previous mechanical trip devices since the force necessary to reset the memory friction clutch is not provided by the tone arm. More particularly, if the plane of the sensing arm 24 is positioned to pass through the center of the supporting spindle 14, then the only force that is required from the tone arm is the component resulting from the sensing arm 24 riding on the arcuate ramp 20 which is of negligible importance. However, even this force can be reduced substantially to zero if the plane of the sensing arm 24 is rotated slightly in a counterclockwise direction as seen in FIG. 2, such that its plane passes below the supporting spindle 14. If this is done, the sensing arm 24 tends to urge the wand 16 in the direction of the arrow 35 which is opposite the direction of the force required from the tone arm when the sensing arm is in contact with the ramp 20. By proper design, these two forces can be made to compensate exactly for each other.

While this invention is described by reference to a preferred embodiment thereof, it is not intended to be limited thereto except insofar as the appended claims are so limited, since modifications coming within the scope of the invention will readily suggest themselves to one skilled in the art.

Having now described the invention, what is claimed is:

1. In a phonograph record player assembly having a turntable rotatably mounted about a center spindle and a tone arm supported by a support spindle and positioned above said turntable and having a stylus member therein adapted to track in a record grooving, the combination comprising a pitch sensitive trip mechanism for recycling the tone arm including a wand fixedly connected to the support spindle so that the wand follows the track of said tone arm across the record, a carriage slidably mounted adjacent to the center spindle, means to slide the said carriage laterally between a forward and a rear position upon each rotation of the turntable, sensing means connected to said carriage and being positioned to contact said wand when the carriage is in its forward position, means to maintain said carriage in its rear position during a major portion of each rotation of the turntable such that the period of contact between said sensing means and said wand is relatively brief, and a trip arm actuated by said sensing means when said wand has moved more than a specified distance during a single rotation of said turntable.

2. In a phonograph record player having a rotatable turntable and tone arm and a stylus member to track the grooving in a supported record, a mechanism for sensing the pitch variation between the playing grooves and the leadout grooves of the supported record thereby to initiate recycling of the tone arm, the combination comprising, a wand fixedly mounted to the support spindle of the tone arm such that the wand follows the track of said tone arm across the record, an arcuate ramp positioned on said wand at the end opposite said support spindle and lying in a plane transverse to the plane of the turntable, a carriage slidably mounted between a forward and a rear position and including means for sliding said carriage between said forward and rear positions once upon each revolution of the turntable, a sensing arm rotatably mounted to said carriage, the forward end of said sensing arm having first and second camming surfaces which are adapted to contact said ramp when said carriage is in its forward position, a trip arm rotatably mounted to said carriage on a common axis with said sensing arm, means on said carriage to limit the movement of said trip arm in one direction, whereby upon movement of the stylus and its supporting tone arm during engagement between the stylus and the grooving of said record, said ramp engages said first camming surface to progressively rotate said sensing arm in a first direction; and upon the more rapid movement of said tone arm during engagement with the lead-out grooves, said ramp engages with said second camming surface to rotate said sensing arm in a second direction and thereby actuate said trip arm, and means to limit the trip arm operation to engagement periods between the ramp and the second camming surface.

3. The cycling apparatus as claimed in claim 2 comprising in addition friction clutch means to control the engagement between the sensing arm and the carriage.

4. The cycling apparatus as claimed in claim 2 comprising in addition friction clutch means to control the engagement between the trip arm and the carriage.

5. The cycling apparatus as claimed in claim 2 comprising in addition friction clutch means to control the engagement between the sensing arm and the carriage, and between the trip arm and the sensing arm.

6. The cycling apparatus as claimed in claim 2 wherein the plane of the sensing arm passes slightly to the side of the axis of said tone arm support spindle in the direction of travel of the tone arm.

7. The cycling apparatus as claimed in claim 2 wherein the means for sliding the carriage between its forward and rear positions comprises a cam fixedly mounted to rotate about the axis of the turntable, a follower attached to the carriage and adapted to be actuated by engagement with said cam, and a resilient means to effect engagement between said cam and follower.

References Cited

UNITED STATES PATENTS 2,373,494 4/1945 Noren et al. -------- 274—1.11

FOREIGN PATENTS 572,688 10/1945 Great Britain.

HARRY N. HAROIAN, *Primary Examiner.*

U.S. Cl. X.R.

274—1